Figures 1, 4:
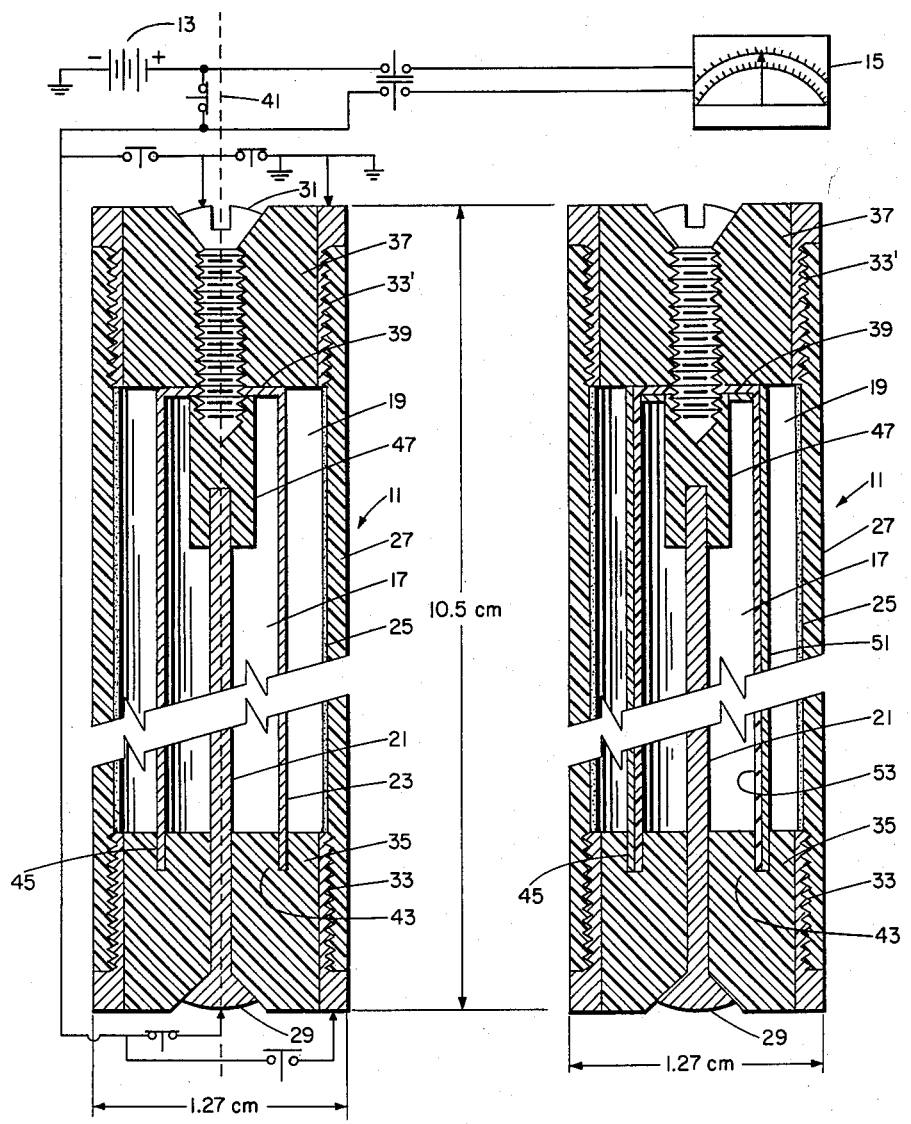

INVENTORS
CARL B. BRAESTRUP
RICHARD T. MOONEY
BY

United States Patent Office 3,119,036
Patented Jan. 21, 1964

3,119,036
RADIATION MONITOR CONTAINING TWO CONCENTRIC IONIZATION CHAMBERS AND MEANS FOR INSULATING THE SEPARATE CHAMBERS
Carl B. Braestrup, New York, and Richard T. Mooney, Hartsdale, N.Y., assignors to the United States of America as represented by the United States Atomic Energy Commission
Filed June 28, 1962, Ser. No. 206,109
2 Claims. (Cl. 313—93)

This invention relates to a radiation monitor and more particularly to a portable radiation monitor for evaluating the dose and energy of incident X-rays or gamma rays.

Radiation monitoring systems have been useful, heretofore, in fluoroscopy and other applications of ionizing radiation. In one of the most commonly used systems an unexposed film has been carried in an enclosed package worn by a person exposed to the radiation and the radiation has caused a reaction which has shown up on the film when the film has been developed. With this system, however, it has been difficult accurately to distinguish the many different radiation energies to which the film has been exposed and without information about the energy of the radiation involved it has not been possible, heretofore, to evaluate the dose received by the deeper seated organs of the persons involved.

In an effort to overcome the shortcomings of the heretofore known systems, heavy or bulky attenuation shields surrounding ionization chambers have been used, and these have been placed side by side with unshielded chambers but these adaptions heretofore have had the disadvantage of directional variation in the response of the unshielded chamber due to the "shadow" of the shielded chamber. Additionally, the shields, used heretofore, have caused significant reduction in X-rays dose sensitivity. It has been advantageous, therefore, to provide an improved radiation monitor without a shadow effect for determining radiation exposure dose and energy with good sensitivity over a wide range of energies. Moreover, it has been advantageous to provide such a monitor that is cheap, compact, portable and has small overall dimensions, approximating those of present pockets monitors, which permit the use of standard charging and reading devices. Because of the space and weight limitations inherent in such a monitor, however, it has been difficult to achieve a suitable compact structure for such dose and energy determinations and economy for widespread use.

It has now been found possible to provide a small, inexpensive and compact double concentric ionization chamber, within the size limitations of present devices, with an energy independent outer chamber and an energy dependent inner chamber. In accordance with this invention, inner, middle and outer concentric electrodes form an inner X-radiation energy dependent ionization chamber and an outer X-radiation energy independent chamber having connections for holding said electrodes together in a compact simple assembly. More particularly, this invention comprises a portable X-ray monitor, comprising inner, middle and outer concentric electrodes forming an X-radiation energy dependent inner ionization chamber and an outer concentric X-radiation energy independent ionization chamber, said middle electrode being a thin cylindrical photo-emissive electrode between said chambers and having an end portion at right angles to the axis of said middle electrode and an opposite open end, a first polymeric cylindrical insulator extending in a parallel plane beyond the outside of said closed end of said middle electrode, a second cylindrical polymeric insulator extending beyond the outside of said open end of said middle electrode and having an annular groove for receiving and closing said open end of said middle electrode, said inner electrode having a connection through said second insulator, said middle electrode having a connection through said first insulator, and said outer electrode having a thin outer polymeric backing shell and an electrical connection between said shell and said insulators for closing said outer chamber and holding said inner, middle and outer electrodes together in a compact assembly. Caps consisting of a metallic shell with an interior insulator are placed on each end of the monitor so that said insulators are in direct contact with said electrical connections.

The above and further novel features of this invention will appear more fully from the following detailed description when the same is read in connection with the accompanying drawings. It is to be expressly understood however, that the drawings are not intended as a definition of the invention but are for the purpose of illustration only.

Figure 3:
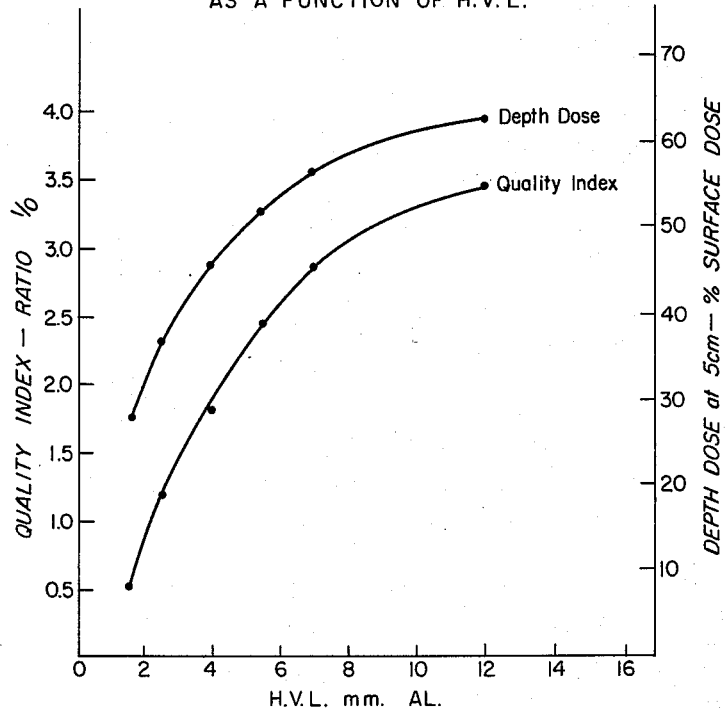
Figure 2:
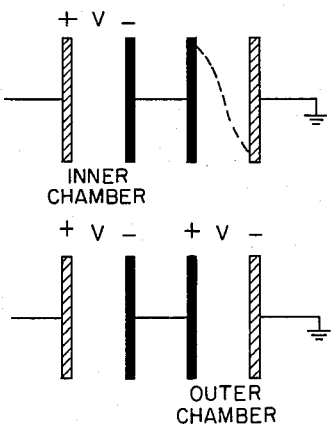

In the figures, where like parts are numbered alike:
FIG. 1 is a partial cross-section of an embodiment of the personnel radiation monitor of this invention;
FIG. 2 is a schematic view of the charging sequence of the apparatus of FIG. 1;
FIG. 3 is a graphic representation of the depth dose and quality index of the apparatus of FIG. 1;
FIG. 4 is a partial cross-section of another embodiment of the apparatus of FIG. 1.

Referring now to FIG. 1, monitor 11 is illustrated for use in measuring incident X-radiation dose and energy. Advantageously the monitor rides in the pocket of a garment but a conventional plastic band, pin or clip, not shown, may attach the monitor to other locations on humans or elsewhere. The monitor 11 approximates the overall dimensions of present pocket monitors, and has, for example, an outside diameter of up to about 0.5 inch (1.27 cm.). This small size lends itself to use with standard charging and reading devices having sockets adapted for use with small O.D. cylinders up to about 0.5 inch. These devices also have a standard voltage source 13 for example, a 60 volt source, and standard reading means such as a commercially available vacuum tube electrometer 15 having suitable full and sensitive scales with an indicator that moves across the scales distances corresponding to the charge on the electrodes of the monitor 11. In a typical sequence, voltage source 13 initially charges ionization chamber 17 of monitor 11 and after radiation exposure, a 60 volt source such as battery 13 placed in series opposition with the chamber 17 produces a resulting voltage difference which when introduced to the grid of the vacuum tube electrometer 15 will cause the electrometer indicator to show the remaining chamber voltage. A like procedure is followed with regard to ionization chamber 19.

Radiation monitors used heretofore have not included an X-radiation energy independent outer ionization chamber an X-radiation energy dependent inner concentric ionization chamber, or exposed connections for holding three concentric electrodes in a simple, inexpensive and compact assembly, or have otherwise been inadequate for providing inexpensive means for monitoring X-ray dose and energy over a wide range.

In accordance with this invention inner thin end rod electrode 21. middle, concentric, cylindrical, foil electrode 23 and outer, thin, concentric, cylindrical electrode 25 form inner first ionization chamber 17 and an outer second concentric ionization chamber 19. As will be understood in more detail hereinafter, the chambers are adapted to contain a suitable gas dielectric, such as air, at room temperature and pressure. Outer chamber 19 has an outer wall 27 that substantially freely transmits incident X-radiation and advantageously comprises a thin resilient hollow cylinder up to about 1.27 cm. in diameter, made, for example, of a polymer such as polystyrene or polyethylene. A thin conductive inner surface, such as a graphite dispersion coated on its inside, forms electrode 25. Wall 27 advantageously has a 0.1 centimeter cross-section and the dispersion on the inside surface thereof has a cross-section that is no greater in cross-sectional thickness than 0.01 cm. Outer chamber 19 responds to the incident radiation and electrode 23, produces corresponding photo-electrons. To this end it has been found that a thin, metallic, photo-emissive electrode 23 provides greater sensitivity in chamber 19 than heretofore used carbon electrodes and a thin photo-emissive copper electrode 23 has been particularly advantageous up to about 0.025 centimeter thick. In the embodiment shown in FIG. 1 the electrode 23 is self-supporting.

It has also been found that a thin, metallic, photo-emissive, rod-shaped electrode 21 has been advantageous in providing high sensitivity and response in inner chamber 17. To this end, a thin aluminum electrode 21 up to about 0.1 centimeter in diameter, spaced from a thin self-sustaining copper electrode 23 about 0.025 cm. thick and up to about 0.64 centimeter in diameter has been advantageous. The thin aluminum and copper electrodes have produced photo-electrons in chamber 17 and the thin copper electrode 23 has attenuated the incident X-radiation to make inner chamber 17 X-radiation energy dependent while not unduly attenuating the radiation so as unduly to reduce the response of inner chamber 17. Inner electrode 21 also has terminal 29 for charging the electrode 21 from voltage source 13 while terminal 31 connects middle electrode 23 with a suitable ground.

A thin middle electrode 23 up to the range of the photo-electrons produced therein produces the maximum number of photo-electrons in chamber 19 and increasing the thickness of electrode 23 beyond this range can unduly reduce the response of chamber 19 by photo-electron capture. Also undue thickness of electrode 23 can reduce the sensitivity of inner chamber 21 by undue attenuation.

It has been advantageous to provide connections for outer electrode 25 which holds the other electrodes 21 and 23 in the proper position in a simple assembly. To this end opposite metallic cylindrical conducting sleeves 33 and 33' press-fit into the inside opposite ends of outer cylindrical shell 27 to contact electrode 25 for charging the electrode 25 and have internal threads which mate with external threads on the outside of opposite, resilient insulators 35 and 37, such as polymeric cylindrical insulators 35 and 37. Insulator 37 extends parallel beyond the end portion 39 of middle electrode 23, which is at right angles to the axis 41 of electrode 23, and holds inner electrode 21, which passes therethrough. Insulator 35 receives open end 44 of middle electrode 23 in its annular groove 43 and extends coaxially with insulator 37 beyond the outside diameter of middle electrode 23 to sleeves 33 and 33' while holding terminal 31 threaded therein for contact with middle electrode 23. Thus the rotation of sleeves 33 and 33' against the threads of insulators 35 and 37 holds the inner middle and outer electrodes 21, 23 and 25 spaced and insulated from each other in a compact simple assembly and closes inner and outer ionization chambers 17 and 19. Also, sleeves 33 and 33', as well as inner electrode 21 and terminal 31, all remain accessible for the charging and reading of the charge on inner and outer chambers 17 and 21 with conventional equipment.

Advantageously the inner threads on the sleeve connections 33 and 33' taper. The threads on sleeve 33 taper sufficiently so that the threads of insulator 35 mate therewith resiliently to deflect the sides of groove 43 into gripping relation with middle electrode 23 and gripping relation with inner electrode 21. Button 45 receives both inner electrode 21 and terminal 31 to insulate the one from the other while preventing too much movement of insulators 35 and 37 toward each other which movement can collapse middle electrode 23.

The following are advantageous chamber dimensions for monitor 11:

TABLE I

*Chamber Dimensions*

| | Outside diameter, cm. | Wall thickness, cm. | Length, cm. |
|---|---|---|---|
| Outside chamber 19 | 1.27 | 0.1 | 9.8 |
| Copper electrode 23 | 0.64 | 0.025 | 9.35 |
| Aluminum electrode 21 | 0.1 | | 8.7 |
| Insulators 35 and 37 | 1.07 | | 0.87 |
| Insulating button 45 | 0.3 | | 0.77 |

In operation chambers 17 and 19 are closed and contain air at room temperature and pressure. Grounding terminal 31 grounds middle electrode 23 while voltage supply 13 charges inner electrode 21 through the terminal 29 thereof. Placing a positive charge on the aluminum electrode 21 in this way establishes a potential difference across the inner chamber 17 as indicated by FIG. 2. After removal of the ground from middle electrode 23, voltage source 13 charges outer electrode 25 through conducting sleeve 33 or sleeves 33 and 33' in the sequence indicated by FIG. 2. The chambers act as condensers and as indicated the chambers are in series so that when voltage source 13 respectively charges both chambers 17 and 19 the voltage between the aluminum rod and ground is twice the charging voltage. After charging, the exposure of the monitor 11 to X-radiation causes a charge reduction in outer chamber 19 corresponding to the X-ray dose and a charge reduction in inner chamber 17 which when compared with the outer chamber charge reduction corresponds with the average incident X-ray energy. The chamber readings with electrometer 15 in the manner described are in reverse sequence to the charging sequence of FIG. 2.

FIG. 3 graphically illustrates the results of actual tests which show close agreement of the depth dose and quality index of apparatus according to FIG. 1. HVL is an abbreviation for half-value-layer, which is a standard indication of radiation energy. The variation of quality index and depth dose is shown in FIG. 3 at 5 cm. as a function of half-value-layer. The quality index is given by the ratio of the reading of the inner chamber 17 to the reading of outer chamber 19 ($I/O$). The depth dose is given for 30 centimeters T.S.D. and 400 cm.$^2$ field. The change in charge of chambers 17 and 19 may be determined in the conventional manner utilizing the sensitive electrometer of a commercially available pocket dosimeter. The resulting variation of quality index and sensitivity with half-value-layer is illustrated in Table II. By using the "voltage difference" method of determining final chamber voltage the indicated sensitivity may be increased by a factor of more than twenty.

TABLE II

*Double Concentric Ionization Chamber*

| HVL, mm. Al | Quality Index, I/O | mr./div. | | mr., full scale [1] | |
|---|---|---|---|---|---|
| | | O | I | O | I |
| 1.6 | .53 | .78 | 1.5 | 156 | 300 |
| 2.5 | .85 | .64 | .75 | 128 | 150 |
| 4.0 | 1.8 | .62 | .34 | 124 | 68 |
| 5.5 | 2.4 | .67 | .28 | 134 | 56 |
| 7.0 | 2.8 | .69 | .25 | 138 | 50 |
| 12.0 | 3.4 | .91 | .27 | 182 | 54 |

[1] 200 divisions.

Incident X-radiation freely passes through outer monitor wall 27 and outer electrode 25 without substantial attenuation. It passes through the air in outer chamber 19 and also strikes thin middle electrode 23 to produce in chamber 19 ionizing products including photoelectrons.

The ionization caused in chamber 19 corresponds to the dose of the incident radiation. This activity causes a corresponding loss in potential from outer electrode 25 to the outside of middle electrode 23 and tests have shown that the sensitivity of this loss in potential of outer chamber 19 is increased by a factor of up to five as compared with a carbon chamber of the same dimensions. Moreover this increase is essentially constant for energies at which the photo-electric process in electrodes 23 and 21 occurs. Thus the outer chamber is effectively wave-length independent in this energy range and its response is a direct measure of exposure dose.

Ionization produced in chamber 17 causes a corresponding loss in potential from inner electrode 21 to middle electrode 23 and tests have shown that photo-electric emission in inner chamber 17 from both the copper and aluminum electrodes 21 and 23 can increase the sensitivity of chamber 17 by a factor of more than ten as compared to a similar chamber having only carbon electrodes. Differential absorption in middle electrode 23 results in a highly energy dependent inner chamber 17. Thus, the ratio of the inner to the outer chamber readings may serve as a quality index.

The assembly of inner electrode 21 against spacing insulator button 45 prevents the accidental crushing of the thin middle electrode 23 during the assembly thereof. The positioning of the thin middle electrode 23 between polymeric insulator 35 and terminal 31 also holds the middle electrode in the proper position and with button 45 and electrode 21 prevents damage to the thin cross-section of electrode 23 from vibration, shock and the like during the use of monitor 11. Also, the threading of sleeves 33 and 33' with outer wall 27 around insulators 35 and 37 hold inner, middle and outer electrodes in a simple, compact, durable and concentrically spaced assembly with accessible, insulated connections.

In another embodiment shown in FIG. 4 the monitor 11 of this invention has the elements and structure shown in FIG. 1 except that middle electrode 51, corresponding to middle electrode 23 of FIG. 1, has a thin polymeric supporting shell 53 up to about 0.01 cm. thick upon which the radiation scattering photo-emissive metal electrode 51 is applied as a coating. The shell 53 is self-sustaining but the electrode 51 does not have to be self-sustaining in this embodiment and continuous uniform coatings down to about ⅛ micron thick are possible. The coating may be electroplated or made with suitable metallic paints or filled resins such as an epoxy resin containing metals including copper, aluminum and silver. The electrode 23 may include a coating on the inside and outside of shell 53 up to a total electrode thickness of 0.025 cm. or may include a graphite dispersion on the inside of shell 53 in place of the metallic coating on the inside of shell 53 up to a total electrode thickness of 0.025 cm.

Actual tests have shown that the ionization chambers of this invention have good sensitivity, up to 50% better than some commercially available monitoring chambers and that the variation of radiation quality index of this monitor 11 is also good, up to a factor of more than six over the range of half-value-layers of 1.6 mm. Al to 12 mm. Al. Moreover, this invention provides a simple, compact, portable and inexpensive monitor having accessible insulated connections for standard charging and reading devices and a thin middle electrode that is durably connected and also protected against collapse.

We claim:

1. A portable X-ray monitor, comprising inner, middle and outer concentric electrodes forming an inner X-radiation energy dependent ionization chamber and an outer X-radiation energy independent ionization chamber, said middle electrode being a thin cylindrical photo-emissive electrode between said chambers and having an end portion at right angles to the axis of said first electrode and an opposite open end, a first polymeric cylindrical insulator extending in a parallel plane beyond the outside of said end portion of said middle electrode, a second cylindrical polymeric insulator extending beyond the outside of said open end of said middle electrode and having an annular groove for receiving and closing said open end of said middle electrode, said inner electrode having an exposed connection through said second insulator, said middle electrode having an exposed connection through said first insulator, and said outer electrode having a thin outer polymeric backing shell and threaded connections between said shell and said insulators for closing said outer chamber and holding said inner, middle and outer electrodes together in an assembly, whereby said monitor is simple, trouble-free and compact.

2. The invention of claim 1 in which said connection between said shell and said second polymeric insulator has threads disposed around said second insulator for resiliently deflecting said second insulator against said middle and inner electrodes thereby to grip and close said open end of said middle electrode and said terminal of said inner electrode.

References Cited in the file of this patent

UNITED STATES PATENTS

| | | |
|---|---|---|
| 2,574,000 | Victoreen | Nov. 6, 1951 |
| 2,756,348 | Schneider | July 24, 1956 |
| 2,968,731 | Davis | Jan. 17, 1961 |
| 2,986,636 | Carlson | May 30, 1961 |
| 3,033,984 | Fisher | May 8, 1962 |